United States Patent
Park et al.

(10) Patent No.: US 11,531,795 B2
(45) Date of Patent: Dec. 20, 2022

(54) APPARATUS FOR OPTIMIZING FLOW ANALYSIS AND METHOD THEREFOR

(71) Applicant: DOOSAN ENERBILITY CO., LTD, Changwon-si (KR)

(72) Inventors: Jeehun Park, Gwangmyeong-si (KR); Hyunsik Kim, Gimpo-si (KR); Jaehyeon Park, Hwaseong-si (KR); Sangjin Lee, Yongin-si (KR)

(73) Assignee: DOSAN ENERBILITY CO., LTD., Changwon (KR)

( * ) Notice: Subject to any disclaimer, the term of this patent is extended or adjusted under 35 U.S.C. 154(b) by 352 days.

(21) Appl. No.: 16/420,130

(22) Filed: May 22, 2019

(65) Prior Publication Data
US 2020/0065440 A1 Feb. 27, 2020

(30) Foreign Application Priority Data
Aug. 21, 2018 (KR) .................. 10-2018-0097540

(51) Int. Cl.
*G06F 30/20* (2020.01)
*G06F 111/10* (2020.01)
*G06F 17/13* (2006.01)

(52) U.S. Cl.
CPC .............. *G06F 30/20* (2020.01); *G06F 17/13* (2013.01); *G06F 2111/10* (2020.01)

(58) Field of Classification Search
CPC ...... G06F 30/20; G06F 17/13; G06F 2111/10; G01F 1/383
See application file for complete search history.

(56) References Cited

U.S. PATENT DOCUMENTS

| | | | |
|---|---|---|---|
| 8,725,470 B1 | 5/2014 | Brown et al. | |
| 9,613,186 B2* | 4/2017 | Fonte | A61B 6/032 |
| 9,785,746 B2* | 10/2017 | Fonte | A61B 34/10 |
| 10,162,932 B2* | 12/2018 | Sharma | G16H 30/40 |
| 2008/0177518 A1* | 7/2008 | Krishnamoorthy | G06F 30/20 |
| | | | 703/9 |
| 2013/0132054 A1* | 5/2013 | Sharma | G16H 30/40 |
| | | | 703/9 |
| 2013/0192388 A1* | 8/2013 | Kono | G01F 1/34 |
| | | | 73/861.47 |
| 2014/0109691 A1* | 4/2014 | Kono | G01F 1/6845 |
| | | | 73/861.47 |
| 2014/0190273 A1* | 7/2014 | Kono | G01F 5/00 |
| | | | 73/861.47 |

(Continued)

FOREIGN PATENT DOCUMENTS

| | | |
|---|---|---|
| JP | 2007-090994 A | 4/2007 |
| KR | 100979177 B1 | 9/2010 |

(Continued)

*Primary Examiner* — Boris Gorney
*Assistant Examiner* — Michael Edward Cocchi
(74) *Attorney, Agent, or Firm* — Harvest IP Law LLP

(57) ABSTRACT

A flow analysis apparatus is provided. The flow analysis apparatus includes a flow analyzer configured to derive a plurality of output signals by performing flow analysis for a plurality of cells by using a flow analytic model for simulating numerical analysis by Computational Fluid Dynamics (CFD) with respect to a plurality of cells that divide a space around a component, and an analysis optimizer configured to perform optimization for the plurality of output signals.

10 Claims, 10 Drawing Sheets

(56) References Cited

U.S. PATENT DOCUMENTS

| | | | | |
|---|---|---|---|---|
| 2015/0142396 A1* | 5/2015 | Lagache | ................ | G06F 30/23 |
| | | | | 703/2 |
| 2015/0324545 A1* | 11/2015 | Fonte | .................... | A61B 6/503 |
| | | | | 703/2 |
| 2016/0015516 A1* | 1/2016 | Bernstein | .............. | A61F 2/2412 |
| | | | | 623/1.1 |
| 2017/0220760 A1* | 8/2017 | Fonte | ................... | A61B 5/7267 |
| 2019/0216605 A1* | 7/2019 | Bernstein | .............. | A61F 2/2475 |

FOREIGN PATENT DOCUMENTS

| | | | |
|---|---|---|---|
| KR | 10-2014-0087653 A | | 7/2014 |
| KR | 20160007838 A | | 1/2016 |
| KR | 10-1612506 B1 | | 4/2016 |

\* cited by examiner

APPARATUS FOR OPTIMIZING FLOW ANALYSIS AND METHOD THEREFOR

CROSS-REFERENCE TO RELATED APPLICATION

This application claims priority to Korean Patent Application No. 10-2018-0097540, filed on Aug. 21, 2018, the disclosure of which is incorporated by reference herein in its entirety.

BACKGROUND

Field

Apparatuses and methods consistent with exemplary embodiments relate to a flow analysis technology, and more particularly, to an apparatus for optimizing flow analysis and a method therefor.

Description of the Related Art

Flow analysis means to confirm the interaction between fluids such as liquids and gases around the target component to be analyzed and the surface defined by the boundary condition, and a change in flow thereby and relevant characteristics. Computational Fluid Dynamics (CFD) is to reproduce the flow of heat and fluid through computational operation, and has reproduced the analysis for the past heat and fluid motion by effective numerical analysis for a short time due to the development of a computer rather than a method based on the experiment, thereby resulting in time and cost savings. A governing equation of fluid behavior is a nonlinear partial differential equation describing the motion of fluid with viscosity, which is an equation including both the convection term and the diffusion term, and can analyze most flows that are present in the natural world such as weather and the fluid flow of current.

SUMMARY

Aspects of one or more exemplary embodiments provide an apparatus for optimizing flow analysis and a method therefor.

Additional aspects will be set forth in part in the description which follows and, in part, will become apparent from the description, or may be learned by practice of the exemplary embodiments.

According to an aspect of an exemplary embodiment, there is provided a flow analysis apparatus including: a flow analyzer configured to predict an output signal of numerical analysis performed multiple times iterations for a plurality of cells by using a flow analytic model for simulating numerical analysis by Computational Fluid Dynamics (CFD) with respect to the plurality of cells that divide a space around a component, and an analysis optimizer configured to perform the optimization for the output signal.

The analysis optimizer may derive primary optimization data by optimizing the output signal primarily through an Equation $$\hat{Y}_{nf}^l(k+T^l) = \frac{1}{s_1+1}\sum_{k_s=0}^{s_1}\left[\hat{Y}^l(k+T^l-k_s)\right],$$
$$l = 1, \ldots, g,$$

where the k and the $T^l$ refer to the number of times of numerical analysis, the l refers to a cell, the $s_1+1$ refers to the number of output signals used for the primary optimization, the $\hat{Y}^l$ refers to the output signal, and the $\hat{Y}_{nf}^l$ refers to the primary optimization data.

The analysis optimizer may derive secondary optimization data by optimizing the primary optimization data secondarily through an Equation $$\hat{Y}_f^l(k+T^l) = \frac{1}{s_2+1}\sum_{k_s=0}^{s_2}\left[\hat{Y}_{nf}^l(k+T^l-k_s)\right], l = 1, \ldots, g,$$

where the k and the $T^l$ refer to the number of times of numerical analysis, the l refers to a cell, the $s_2+1$ refers to the number of the primary optimization data used for the secondary optimization, the $\hat{Y}_{nf}^l$ refers to the primary optimization data, and the $\hat{Y}_f^l$ refers to the secondary optimization data.

The flow analysis apparatus further includes a model deriver configured to generate the flow analytic model by using analytic data used for the numerical analysis.

The flow analytic model may include one or more signal generating models for predicting an input signal contributing to an output signal of numerical analysis performed multiple times iterations among the plurality of input signals through the analytic data, and an analytic model for predicting an output signal of numerical analysis performed multiple times iterations through the analytic data.

The signal generating model may predict the input signal contributing to the output signal of the numerical analysis performed multiple times iterations through an Equation $$\hat{V}(k+T) = HQ\begin{bmatrix} V(k) \\ Y(k) \end{bmatrix} + D,$$

where the k and the T refer to the number of times of numerical analysis, the A refers to a degree of influence, the P refers to a weight, the C refers to a cancellation constant, the Y(k) refers to an output signal of the $k^{th}$ numerical analysis, the $\hat{V}(k+T)$ refers to an input signal of the $(k+T)^{th}$ numerical analysis, and the $\hat{Y}(k+T)$ refers to an output signal of the $(k+T)^{th}$ numerical analysis.

The analytic model may predict the output signal of the numerical analysis performed multiple times iterations through an Equation $$\hat{Y}(k+T) = AP\begin{bmatrix} Y(k) \\ \hat{V}(k+T) \end{bmatrix} + C,$$

where the k and the T refer to the number of times of numerical analysis, the A refers to a degree of influence, the P refers to a weight, the C refers to a cancellation constant, the Y(k) refers to an output signal of the $k^{th}$ numerical analysis, the $\hat{V}(k+T)$ refers to an input signal of the $(k+T)^{th}$ numerical analysis, and the $\hat{Y}(k+T)$ refers to an output signal of the $(k+T)^{th}$ numerical analysis.

According to an aspect of another exemplary embodiment, there is provided a flow analysis apparatus including: a flow analyzer configured to perform flow analysis for a plurality of cells that divide a space around a design target component by using a flow analytic model for simulating numerical analysis by Computational Fluid Dynamics (CFD), and an analysis optimizer configured to optimize a plurality of output signals that are the result of the flow analysis.

The analysis optimizer may include a filter configured to remove noise in each of the plurality of output signals through at least one filter, a primary optimizer configured to optimize the output signal from which the noise has been removed primarily, and a secondary optimizer configured to optimize the primarily optimized output signal secondarily.

The primary optimizer may derive primary optimization data by optimizing the output signal primarily through an Equation $$\hat{Y}_{nf}^l(k+T^l) = \frac{1}{s_1+1}\sum_{k_s=0}^{s_1}\left[\hat{Y}^l(k+T^l-k_s)\right], l=1,\ldots,g,$$

where the k and the $T^l$ refer to the number of times of numerical analysis, the l refers to a cell, the $s_1+1$ refers to the number of the output signals used for the primary optimization, the $\hat{Y}^l$ refers to the output signal, and the $\hat{Y}_{nf}^l$ refers to the primary optimization data.

The secondary optimizer may derive secondary optimization data by optimizing the primary optimization data secondarily through an Equation $$\hat{Y}_f^l(k+T^l) = \frac{1}{s_2+1}\sum_{k_t=0}^{s_2}\left[\hat{Y}_{nf}^l(k+T^l-k_t)\right], l=1,\ldots,g,$$

where the k and the $T^l$ refer to the number of times of numerical analysis, the l refers to a cell, the $s_2+1$ refers to the number of the primary optimization data used for the secondary optimization, the $\hat{Y}_{nf}^l$ refers to the primary optimization data, and the $\hat{Y}_f^l$ refers to the secondary optimization data.

The filter may remove noise of the result of the flow analysis through at least one filter among an averaging filter, a moving average filter, a low-pass filter, a high-pass filter, a band-pass filter, and a Kalman filter.

The flow analyzer may include a numerical analyzer configured to derive analytic data including an input signal and an output signal corresponding to the input signal by performing numerical analysis by Computational Fluid Dynamics with respect to the plurality of cells that divide the space around the design target component, a signal generator configured to derive an input signal contributing to an output signal of numerical analysis performed multiple times iterations by inputting the analytic data including the input signal and the output signal to a signal generating model, and an analyzer configured to derive an output signal of numerical analysis performed multiple times iterations by inputting the output signal of the analytic data and the contributing input signal to the analytic model.

The flow analysis apparatus further includes a model deriver configured to generate a flow analytic model for simulating the numerical analysis by the Computational Fluid Dynamics (CFD).

The model deriver may include an analytic data storage configured to store analytic data including a plurality of input signals used for the numerical analysis and a plurality of output signals corresponding to each of the plurality of input signals, a signal generating model deriver configured to generate the signal generating model for deriving an input signal contributing to an output signal of numerical analysis performed multiple times iterations among the plurality of input signals through the analytic data, and an analytic model deriver configured to generate the analytic model for deriving an output signal of numerical analysis performed multiple times iterations through the analytic data.

The signal generating model may derive the input signal contributing to the output signal of the numerical analysis performed multiple times iterations through an Equation $$\hat{V}(k+T) = HQ\begin{bmatrix}V(k)\\Y(k)\end{bmatrix}+D,$$

where the k and the T refer to the number of times of numerical analysis, the H refers to a degree of influence, the Q refers to a weight, the D refers to a cancellation constant, the V(k) refers to an input signal of the $k^{th}$ numerical analysis, the V(k) refers to an output signal of the $k^{th}$ numerical analysis, and the $\hat{V}(k+T)$ refers to an input signal of the $(k+T)^{th}$ numerical analysis.

The analytic model may predict the output signal of the numerical analysis performed multiple times iterations through an Equation $$\hat{Y}(k+T) = AP\begin{bmatrix}Y(k)\\\hat{V}(k+T)\end{bmatrix}+C,$$

where the k and the T refer to the number of times of numerical analysis, the A refers to a degree of influence, the P refers to a weight, the C refers to a cancellation constant, the Y(k) refers to an output signal of the $k^{th}$ numerical analysis, the $\hat{V}(k+T)$ refers to an input signal of the $(k+T)^{th}$ numerical analysis, and the $\hat{Y}(k+T)$ refers to an output signal of the $(k+T)^{th}$ numerical analysis.

According to an aspect of another exemplary embodiment, there is provided a flow analysis method including: deriving, by a flow analyzer, a plurality of output signals by performing flow analysis for a plurality of cells that divide a space around a design target component by using a flow analytic model for simulating numerical analysis by Computational Fluid Dynamics (CFD), and performing, by an analysis optimizer, optimization for the plurality of output signals.

The performing the optimization may include removing, by a filter, noise in each of the plurality of output signals, optimizing, by a primary optimizer, the output signal from which the noise has been removed primarily, and optimizing, by a secondary optimizer, the primarily optimized output signal secondarily.

The optimizing the output signal primarily may include deriving, by the primary optimizer, primary optimization data by optimizing the output signal primarily through an Equation $$\hat{Y}_{nf}^1(k+T^1) = \frac{1}{s_1+1}\sum_{k_s=0}^{s_1}\left[\hat{Y}^1(k+T^1-k_s)\right], l=1,\cdots,g,$$

where the k and the $T^l$ refer to the number of times of numerical analysis, the l refers to a cell, the $s_1+1$ refers to the number of the output signals used for the primary optimization, the $\hat{Y}^l$ refers to the output signal, and the $\hat{Y}_{nf}^l$ refers to the primary optimization data.

The optimizing the primary optimization data secondarily may include deriving, by the secondary optimizer, secondary optimization data by optimizing the primary optimization data secondarily through an Equation $$\hat{Y}_f^1(k+T^1) = \frac{1}{s_2+1}\sum_{k_s=0}^{s_2}\left[\hat{Y}_{nf}^1(k+T^1-k_s)\right], l=1,\cdots,g,$$

where the k and the $T^l$ refer to the number of times of numerical analysis, the l refers to a cell, the $s_2+1$ refers to the number of the primary optimization data used for the secondary optimization, the $\hat{Y}_{nf}^l$ refers to the primary optimization data, and the $\hat{Y}_f^l$ refers to the secondary optimization data.

The performing the flow analysis may include deriving, by a numerical analyzer, analytic data by performing the numerical analysis for the design target component, deriving, by a signal generator, the input signal contributing to the output signal of the numerical analysis performed multiple times iterations through the signal generating model from the analytic data derived from the numerical analyzer, and deriving an output signal of the numerical analysis performed multiple times iterations through the analytic model from the input signal derived from the signal generator.

The flow analysis method further includes generating, by a signal generating model deriver, the signal generating model for predicting the input signal contributing to the output signal of the numerical analysis performed multiple times iterations among the plurality of input signals through the analytic data before the deriving the plurality of output signals, and generating, by an analytic model deriver, the analytic model for predicting the output signal of the numerical analysis performed multiple times iterations among the plurality of input signals through the analytic data.

As described above, according to one or more exemplary embodiments, it is possible to shorten the time for performing the flow analysis, thereby shortening the time required for developing a component, and to provide a more reliable flow analysis result through optimization.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
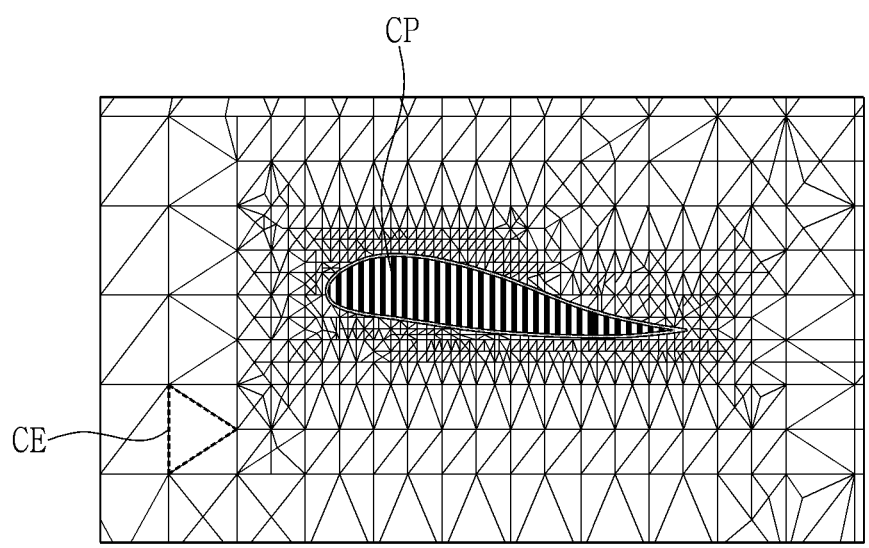
FIG. 1 is a diagram illustrating an example of dividing a design target component and the periphery thereof into a plurality of cells according to an exemplary embodiment.

Hereinafter, various modifications and various embodiments will be described in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein. In order to clearly illustrate the disclosure in the drawings, some of the elements that are not essential to the complete understanding of the disclosure may be omitted, and like reference numerals refer to like elements throughout the specification.

The terminology used in the disclosure is for the purpose of describing specific embodiments only and is not intended to limit the scope of the disclosure. The singular expressions "a", "an", and "the" are intended to include the plural expressions as well unless the context clearly indicates otherwise. In the disclosure, terms such as "comprises," "includes,' or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Figure 2:
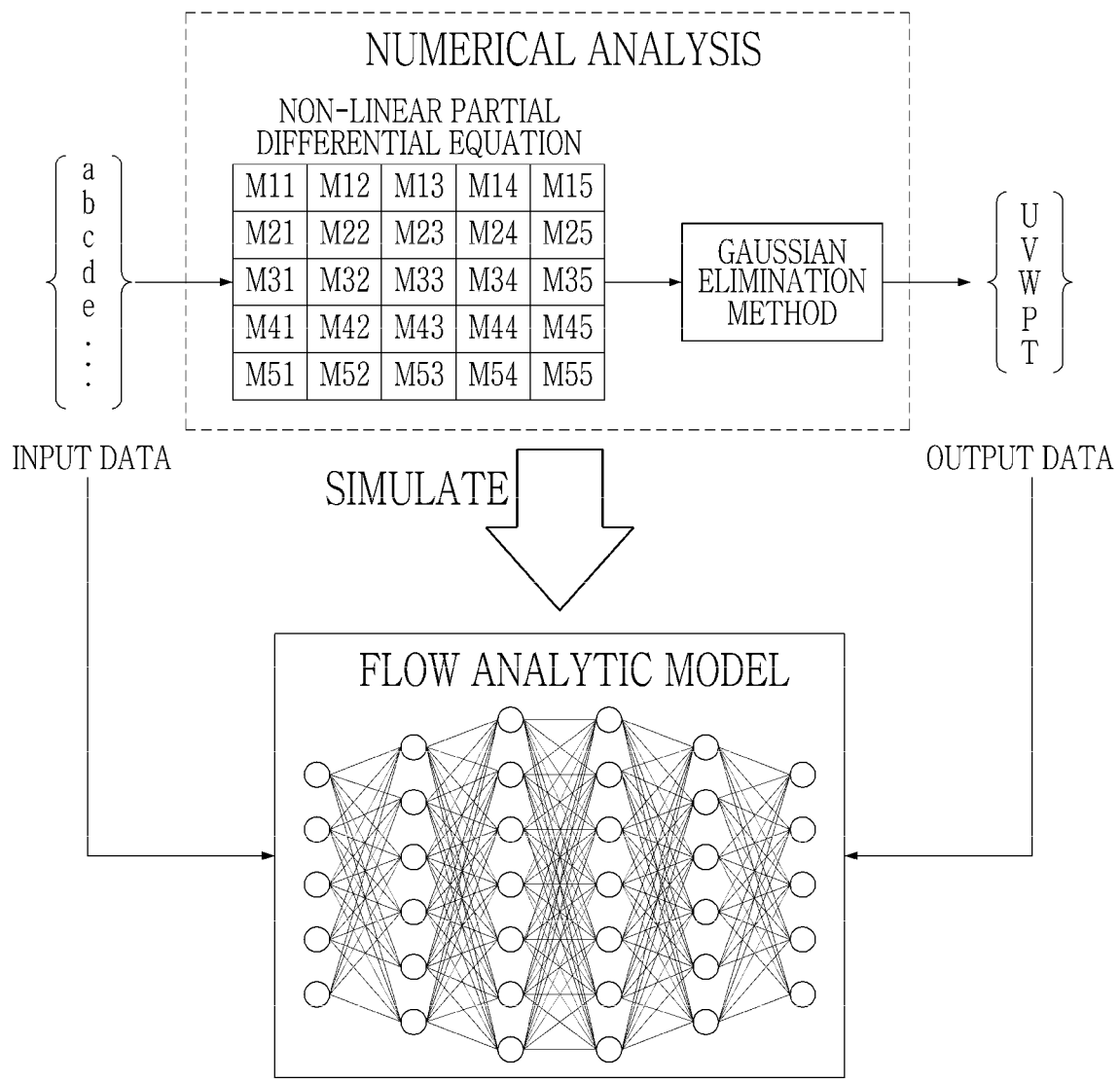
FIG. 2 is a diagram for explaining a flow analytic model according to an exemplary embodiment.
Figure 3:
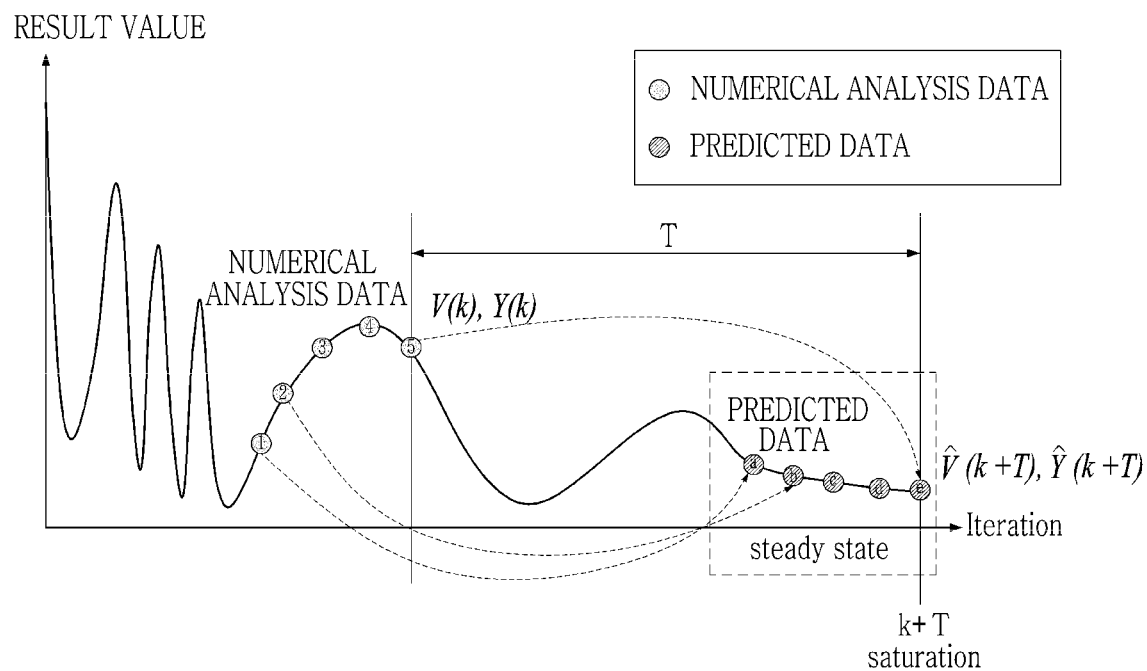
FIG. 3 is a graph for explaining the numerical analysis performed multiple times iterations for the flow analysis according to an exemplary embodiment.

First, a flow analytic model according to an embodiment will be described. FIG. 1 is a diagram illustrating an example of dividing a design target component and the periphery thereof into a plurality of cells according to an exemplary embodiment. FIG. 2 is a diagram for explaining a flow analytic model according to an exemplary embodiment. FIG. 3 is a graph for explaining numerical analysis performed multiple times iterations for the flow analysis according to an exemplary embodiment of.

Referring to FIG. 1, a flow analysis can be performed to design a component CP, for example, a component such as a blade of a turbine. The flow analysis is to divide the area around the component CP into a plurality of cells CE, and to derive characteristics of fluid from each of the plurality of cells CE according to a boundary condition of the plurality of divided cells CE. An input signal for this flow analysis may be the boundary condition. For example, the input signal can be a laminar flow viscosity of fluid, a turbulent conduction, a time difference between numerical analyses performed iteration, etc. in each cell CE. An output signal may be characteristics of fluid. For example, the output signal can be a density, a momentum in the x and y directions, an internal energy, etc. in each cell CE.

model. Therefore, it is possible to reduce the time for obtaining the approximate solution of the partial differential equation, thereby shortening the flow analysis time. Therefore, it is possible to shorten the time for designing the component.

The flow analytic model can use at least one of the models listed in Table 1.

TABLE 1

| Parametric Model | Transfer Function | Equation Error | Auto-Regressive eXogeneous (ARX) Nonlinear Auto-Regressive eXogeneous (NARX) Finite Impulse Response (FIR) Auto-Regressive Moving Average eXogenious (ARMAX): Pseudolinear Regression Model Auto-Regressive (AR) Auto-Regressive Moving Average (ARMA) Auto-Regressive Auto-Regressive eXogeneous (ARARX): Generalized Least-Squares Model Auto-Regressive Auto-Regressive Moving Average eXogeneous (ARARMAX): Extended Matrix Model |
| --- | --- | --- | --- |
| | | Output Error | Output Error (OE) Box and Jenkins (BJ) |
| | State Space | | Linear Time Invariant (LTI), Linear Time Variant (LTV) Linear Model, Nonlinear Model Continuous Time, Discrete Time, Delay Time Single Input Single Output (SISO), Multi Input Multi Output (MIMO) Stochastic Model, Deterministic Model Robust, Open Loop, Closed Loop |
| Non Parametric Model | | | Non Parametric (Data Set Type) Impulse Response Step Response Frequency Transfer Function Tree Neural Network (NN): FF, FB, Radial Basis Function, Convolutional, Spiking, Deep NN (Deep Belief Network), Recurrent NN |

Referring to FIG. 2, the numerical analysis by Computational Fluid Dynamics (CFD) can be performed for the flow analysis. Hereinafter, the expression of the numerical analysis in an exemplary embodiment means numerical analysis by Computational Fluid Dynamics (CFD). For the numerical analysis, the periphery of the component CP is divided into a plurality of cells CE. Then, a nonlinear partial differential equation for the plurality of cells CE is established. Then, an approximate solution of the partial differential equation can be obtained, for example, by a Gaussian elimination method.

Referring to a graph of FIG. 3, the numerical analysis is performed multiple times (k+T) iterations due to the characteristics of fluid. Conceptually, the result value of the numerical analysis of the predetermined number of times (k) at the initial stage is not steady due to the characteristics of fluid, and becomes a steady state only after performing the multiple times iterations. Therefore, the numerical analysis by Computational Fluid Dynamics performs iterations until the fluid around the component becomes a saturation state. That is, the flow analysis is for obtaining an output signal of the numerical analysis performed multiple times iterations. The numerical analysis for obtaining the approximate solution of this partial differential equation takes a long time because a parallel processing cannot be performed.

Therefore, according to one or more exemplary embodiments, the result of the numerical analysis performed multiple times iterations by Computational Fluid Dynamics may be obtained by using an input signal and an output signal that are analytic data used for the numerical analysis by Computational Fluid Dynamics. That is, a flow analytic model for predicting the output signal is generated, and the flow analysis is performed by using the generated flow analytic In addition, the flow analytic model can be derived by using at least one of the optimization algorithms listed in Table 2.

TABLE 2

| Parametric Model | Prediction Error Method (PEM) Maximum Likelihood Method (MLM) Least-Squares Method (LSM) -Batch Least-Squares Method -Off-line Least-Squares Method Extended Least-Squares Method (ELSM) Generalized Least-Squares Method (GLSM) Recursive Least-Squares Method (RLS) Instrumental Variable Method (IVM) Principle Component Analysis (PCA) Dynamic Principle Component Analysis (DPCA) Partial Least Squares (PLS) SubSpace-based State Space Model Identification (4SID) Method (+ Singular Value Decomposition (SVD)) (+ QR Decomposition) -N4SID Method -Multivariable Output Error State sPace (MOESP) Method Canonical VariateAnalysis (CVA) Singular Value Decomposition Minimal Realization Method (MRM) |
| --- | --- |
| Non Parametric Model | Transient Response Method Correlation Analysis Frequency Response Method Spectral Analysis Method Empirical Transfer Function Estimate (ETFE) Method Single/Multi-Layer Perceptron Learning, Back-Propagation, Gradient Descent LayerwisePretraining: Auto-Encoder, BolzmannMachine |

Figure 4:
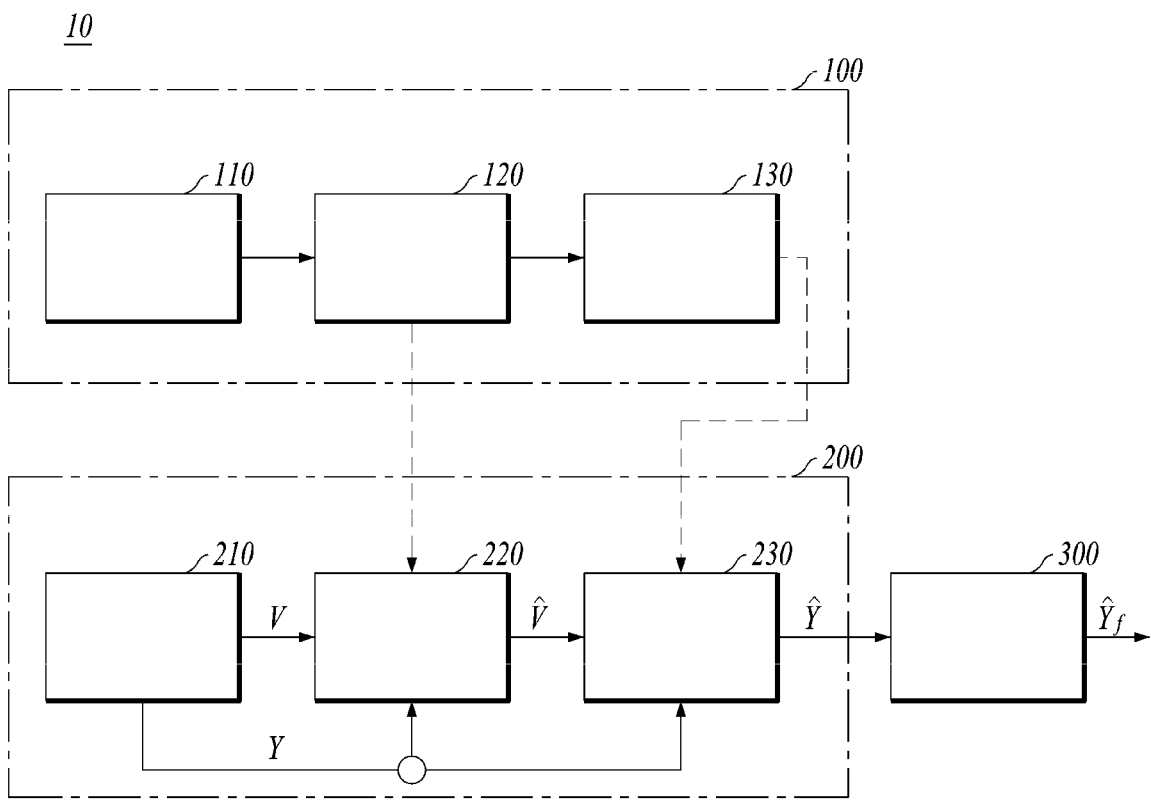
FIG. 4 is a block diagram for explaining a configuration of a flow analysis apparatus according to an exemplary embodiment.

Next, a flow analysis apparatus according to an exemplary embodiment will be described. FIG. 4 is a block diagram for explaining a configuration of a flow analysis apparatus according to an exemplary embodiment. Referring to FIG. 4, a flow analysis apparatus 10 according to an exemplary embodiment includes a model deriver 100, a flow analyzer 200, and an analysis optimizer 300.

The model deriver 100 generates a flow analytic model for performing the flow analysis for a plurality of cells that divide a space around a target. At this time, the model deriver 100 can generate a flow analytic model by using the analytic data used for the numerical analysis by Computational Fluid Dynamics (CFD). Here, the analytic data includes a plurality of input signals used for the numerical analysis performed multiple times iterations and a plurality of output signals corresponding to the plurality of input signals. The flow analytic model derives the result of the numerical analysis performed multiple times iterations by Computational Fluid Dynamics by simulating the numerical analysis by Computational Fluid Dynamics.

In particular, the flow analytic model can be composed of a plurality of models. The flow analytic model can include one or more signal generating models and one or more analytic models. The model deriver 100 includes an analytic data storage 110, a signal generating model deriver 120, and an analytic model deriver 130. The signal generating model and the analytic model can use any one of the plurality of models of Table 1.

The analytic data storage 110 stores the analytic data according to an exemplary embodiment. The analytic data can become analytic data used for the numerical analysis by Computational Fluid Dynamics for the plurality of cells CE that divides the area around the component CP. The analytic data includes a plurality of input signals and a plurality of output signals corresponding to the plurality of input signals. For example, the input signal can be the laminar flow viscosity of the fluid, the turbulent conduction, the time difference between the numerical analyses performed iterations, etc. in each cell CE. The output signal means the characteristics of the fluid. For example, the output signal can be the density, the momentum in the x and y directions, the internal energy, etc. in each cell CE.

The signal generating model deriver 120 generates a signal generating model for deriving the input signal contributing to the output signal of the numerical analysis performed multiple times iterations among the plurality of input signals by using the analytic data stored in the analytic data storage 110. For example, if there are a plurality of input signals, the input signal for determining the output signal of the numerical analysis after performing the numerical analysis multiple times iterations can become a part of the plurality of input signals. As described above, the input signal contributing to the output signal means an input signal of the type and the iteration timing, which affect a change in the value of the output signal, among the input signals of a plurality of types and iteration timings. That is, the signal generating model is for predicting the input signal contributing to the output signal after performing the numerical analysis multiple times iterations.

According to an exemplary embodiment, the signal generating model is as in Equation 1.

$$\hat{V}(k+T) = HQ\begin{bmatrix} V(k) \\ Y(k) \end{bmatrix} + D \qquad \text{Equation 1}$$

In Equation 1, k and T refer to the number of times of numerical analysis, V(k) refers to the input signal of the $k^{th}$ numerical analysis, Y(k) refers to the output signal of the $k^{th}$ numerical analysis, and $\hat{V}(k+T)$ refers to the input signal of the $(k+T)^{th}$ numerical analysis. Here, T can have a different value or the same value according to the type of the output signal to be predicted (e.g., density, momentum in the x and y directions, internal energy, etc.). H refers to the degree of influence on each cell. For example, only values corresponding to the corresponding cell affect the prediction of a value of any one cell, and values of other cells do not affect it. That is, it is a value for selecting a cell influenced by the corresponding input signal or output signal. Q refers to a weight. That is, the weight Q means the degree influenced by V(k) and Y(k) on the output $\hat{V}(k+T)$. In addition, D refers to a cancellation constant for canceling a modeling error. That is, referring to the Equation 1 and the graph of FIG. 3, the signal generating model derives the analytic data used for the $k^{th}$ numerical analysis, that is, the input signal $\hat{V}(k+T)$ contributing to the output signal according to the $(k+T)^{th}$ numerical analysis from the input signal V(k) and the output signal Y(k).

In order to derive the signal generating model, the signal generating model deriver 120 constitutes the relationship equation where, for example, the degree of influence H, the weight Q, and the cancellation constant D, which are the parameters of the Equation 1, are not determined. The signal generating model deriver 120 derives the parameters, that is, the degree of influence H, the weight Q, and the cancellation constant D, through the optimization algorithm by inputting a plurality of analytic data, for example, V(k), Y(k), and V(k+T) to the relationship equation. The optimization algorithm can be, for example, a Least-Squares Method, a Backpropagation Algorithm, etc. As described above, if the parameters H, Q, and D of the relationship equation are determined, the signal generating model as in Equation 1 is completed.

For example, the signal generating model deriver 120 can constitute an Artificial Neural Network having a transfer function where the weight connections as in the Equation 1 are the parameters H, Q, and D. The parameters H, Q, and D, which are the weight connections, can be derived through the optimization algorithm (e.g., the Backpropagation algorithm) by using the analytic data as learning data, and the artificial neural network where the parameters H, Q and D have been determined can be derived as a signal generating model.

The analytic model deriver 130 derives the analytic model for calculating the output signal of the numerical analysis performed multiple times iterations by using the analytic data that are a plurality of input signals used for the numerical analysis based on the Computational Fluid Dynamics (CFD) and a plurality of output signals corresponding to the plurality of input signals. This analytic model simulates the numerical analysis performed multiple times iterations based on the Computational Fluid Dynamics (CFD).

For example, the analytic model is as in Equation 2.

$$\hat{Y}(k+T) = AP\begin{bmatrix} Y(k) \\ \hat{V}(k+T) \end{bmatrix} + C \qquad \text{Equation 2}$$

In the Equation 2, k and T refer to the number of times of numerical analysis, V(k) refers to the output signal of the $k^{th}$ numerical analysis, $\hat{V}(k+T)$ refers to the input signal of the $(k+T)^{th}$ numerical analysis, and $\hat{Y}(k+T)$ refers to the output signal of the $(k+T)^{th}$ numerical analysis. Here, T can have a different value or the same value according to the type of the output signal to be predicted (e.g., density, momentum in the x and y directions, internal energy, etc.). A refers to the degree of influence on each cell. For example, only values corresponding to the corresponding cell affect the prediction of a value of any one cell and values of other cells do not affect it. That is, it is a value for selecting a cell influenced by the corresponding input signal or output signal. P refers to a weight. That is, the weight P means the degree influenced by Y(k) and $\hat{V}$(k+T) on the output $\hat{Y}$(k+T). In addition, C refers to a cancellation constant for canceling a modeling error.

Referring to the Equation 1, the Equation 2, and the graph of FIG. 3, the signal generating model of the Equation 1 derives the input signal $\hat{V}$(k+T) contributing to the output signal according to the (k+T)$^{th}$ numerical analysis from the input signal V(k) and the output signal Y(k) of the k$^{th}$ numerical analysis. The analytic model of the Equation 2 can derive the output signal Y(k) of the analytic data used for the k$^{th}$ numerical analysis, and the output signal $\hat{Y}$(k+T) according to the (k+T)$^{th}$ numerical analysis from the input signal $\hat{V}$(k+T) of the (k+T)$^{th}$ numerical analysis derived by the signal generating model of the Equation 1.

To derive the analytical model, the analytic model deriver 130 constitutes the relationship equation where, for example, the degree of influence A, the weight P, and the cancellation constant C, which are the parameters of the Equation 2, are not determined. The analytic model deriver 130 derives the parameters, that is, the degree of influence A, the weight P, and the cancellation constant C, through the optimization algorithm by inputting a plurality of analytic data, for example, Y(k), V(k+T), and Y(k+T) to the relationship equation where the parameters A, P, and C are not determined. The optimization algorithm can be, for example, a Least-Squares Method, a Backpropagation Algorithm, etc. As described above, if the parameters A, P, and C are determined, the analytical model as in the Equation 2 is completed.

For example, the analytic model deriver 130 can constitute an artificial neural network having a transfer function where the weight connections as in the Equation 2 are the parameters A, P, and C. The parameters A, P, and C, which are the weight connections, can be derived through the optimization algorithm (e.g., the Backpropagation algorithm) by using the analytic data as learning data, and the artificial neural network where the parameters A, P, and C, which are the weight connections, have been determined can be derived by the analytic model.

The flow analyzer 200 performs the flow analysis for the plurality of cells CE that divide the space around the design target component CP by using the flow analytic model including the signal generating model and the analytical model derived from the model deriver 100. The flow analyzer 200 includes a numerical analyzer 210, a signal generator 220, and an analyzer 230.

The numerical analyzer 210 performs the numerical analysis by Computational Fluid Dynamics (CFD). Therefore, an input signal for the numerical analysis and an output signal corresponding to the input signal are derived. For example, the input signal according to the numerical analysis can be V(k), and the output signal can be Y(k).

The signal generator 220 predicts the input signal contributing to the output signal of the numerical analysis performed multiple times (k+T) iterations by reflecting the input signal and the output signal derived from the numerical analyzer 210 to the signal generating model generated by the signal generating model deriver 120. For example, the signal generator 220 can derive the input signal $\hat{V}$(k+T) contributing to the output signal of the numerical analysis performed multiple times (k+T) iterations by inputting the input signal V(k) and the output signal Y(k) to the signal generating model as in the Equation 1.

The analyzer 230 predicts the output signal of the numerical analysis performed multiple times (k+T) iterations by reflecting the input signal predicted by the signal generator 220 and the output signal derived from the numerical analyzer 210 to the analytical model derived from the analytical model deriver 130. For example, the analyzer 230 can derive the output signal $\hat{Y}$(k+T) of the numerical analysis performed multiple times (k+T) iterations by inputting the predicted input signal $\hat{V}$(k+T) and the output signal Y(k) to the analytical model as in the Equation 2.

Referring to FIG. 3, when the flow analysis is performed through the numerical analysis by Computational Fluid Dynamics (CFD), the desired result of the flow analysis, that is, the output signal $\hat{Y}$(k+T) can be obtained only after the numerical analysis is performed the number of times (k+T) iterations. However, because the desired result of the flow analysis $\hat{Y}$(k+T) can be obtained from the k$^{th}$ numerical analysis of the numerical analyzer 210 through the flow analytic model, it is not necessary to perform the numerical analysis the number of times T iterations, thereby shortening the time required for the flow analysis by the time for performing the numerical analysis the number of times T iterations. Therefore, it is possible to shorten the time required for developing the component.

The analysis optimizer 300 is for optimizing the predicted result of the flow analysis by using the predicted result according to a plurality of flow analyses derived from the flow analyzer 200. The result of the flow analysis converges to a specific value as the numerical analysis is performed multiple times iterations. Therefore, it is possible to optimize the result (the plurality of output signals) predicted by the flow analyzer 200 through the analysis optimizer 300.

Figure 5:
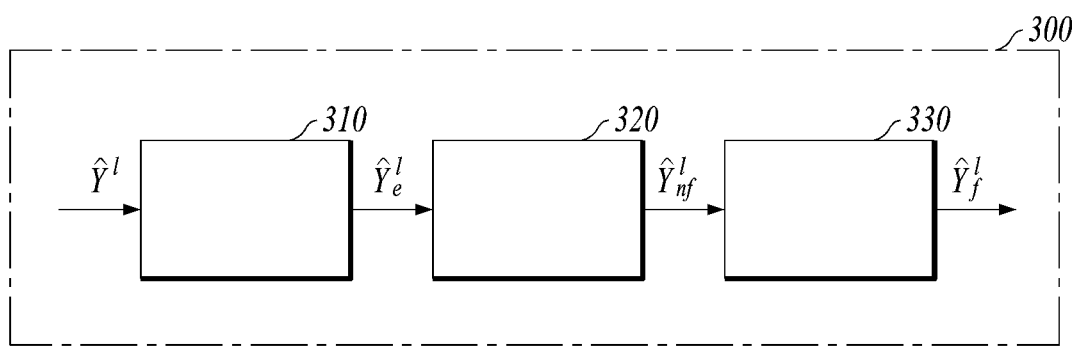
FIG. 5 is a block diagram for explaining a detailed configuration of an analysis optimization unit according to an exemplary embodiment.

The analysis optimizer 300 will be described in more detail in FIG. 5. FIG. 5 is a block diagram for explaining a detailed configuration of an analysis optimizer according to an exemplary embodiment. Referring to FIG. 5, the analysis optimizer 300 includes a filter 310, a primary optimizer 320, and a secondary optimizer 330.

The filter 310 is for removing noise of the output signal derived from the flow analyzer 200. For example, the filter 310 can remove the noise by using at least one filter. This filter includes, for example, an averaging filter, a moving average filter, a low-pass filter such as an exponentially weighted moving average filter, a high-pass filter, a band-pass filter, and a Kalman filter.

For example, when using the exponentially weighted moving average filter, the filter 310 can remove noise through Equation 3.

$$\hat{Y}_e^l(k+T^l) = \alpha \hat{Y}_e^l(k+T^l-1) + (1-\alpha)\hat{Y}^l(k+T^l),$$

$$0 < \alpha < 1, l=1, \ldots, g \qquad (3)$$

In the Equation 3, k and $T^l$ refer to the number of times of numerical analysis, and l refers to a cell to be analyzed and can have 1 to g cells (g is a natural number).

The primary optimizer 320 is for optimizing the predicted data that are the result of the flow analysis of the flow analyzer 200 primarily. The primary optimizer 320 outputs a primary optimization value through a primary optimization operation for the plurality of output signals that are outputs of the flow analyzer 200. For example, the primary optimizer 320 can perform the optimization operation primarily through Equation 4.

$$\hat{Y}_{nf}^1(k+T^1) = \frac{1}{s_1+1}\sum_{k_s=0}^{s_1}\left[\hat{Y}^1(k+T^1-k_s)\right], l=1,\cdots,g \quad \text{Equation 4}$$

In the Equation 4, k and refer to the number of times of numerical analysis, and l refers to a cell to be analyzed and can have 1 to g cells (g is a natural number). $s_1+1$ refers to the number of output signals used for the primary optimization. $\hat{Y}^l$ refers to the output signal, and $\hat{Y}_{nf}^l$ refers to the primary optimization data. As described above, according to an exemplary embodiment, the primary optimizer 320 can output the average value of $s_1+1$ output signals as the primary optimization data through the primary optimization operation.

The secondary optimizer 330 is for optimizing the result primarily optimized by the primary optimizer 320 secondarily. The secondary optimizer 330 outputs a secondary optimization value through a secondary optimization operation for the plurality of primary optimization data that are outputs of the primary optimizer 320.

For example, the secondary optimizer 330 can perform the optimization operation secondarily through Equation 5.

$$\hat{Y}_{f}^1(k+T^1) = \frac{1}{s_2+1}\sum_{k_s=0}^{s_2}\left[\hat{Y}_{nf}^1(k+T^1-k_s)\right], l=1,\cdots,g \quad \text{Equation 5}$$

In the Equation 5, k and refer to the number of times of numerical analysis, and l refers to a cell to be analyzed and can have 1 to g cells (g is a natural number). $s_2+1$ refers to the number of the primary optimization data used for the secondary optimization. $\hat{Y}_{nf}^l$ refers to the primary optimization data, and $\hat{Y}_{f}^l$ refers to the secondary optimization data. As described above, according to an exemplary embodiment, the secondary optimizer 330 can output the average value of $s_2+1$ primary optimization data as the secondary optimization data through the secondary optimization operation.

Figure 6:
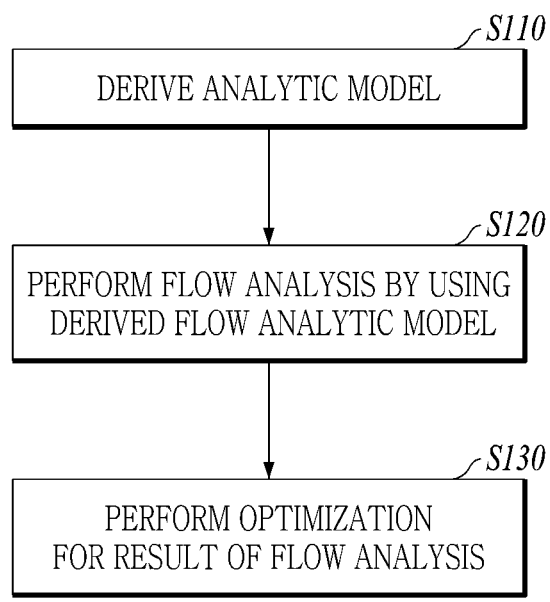
FIG. 6 is a flowchart for explaining a flow analysis method according to an exemplary embodiment.

Next, a flow analysis method according to an exemplary embodiment will be described. FIG. 6 is a flowchart for explaining a flow analysis method according to an exemplary embodiment.

Referring to FIG. 6, the model deriver 100 generates a flow analytic model for performing the flow analysis for a plurality of cells CE that divide a space around the flow analyzing target component CP by using the analytic data (operation S110). Herein, the analytic data includes a plurality of input signals used for the numerical analysis performed multiple times iterations by Computational Fluid Dynamics (CFD) and a plurality of output signals corresponding to the plurality of input signals. In particular, the flow analytic model simulates the numerical analysis performed multiple times iterations by Computational Fluid Dynamics (CFD). In addition, the flow analytic model can also include one or more signal generating models and one or more analytic models.

The flow analyzer 200 performs the flow analysis for the plurality of cells CE in the space around the flow analyzing target component CP through the flow analytic model including one or more signal generating models and one or more analytic models previously derived from the model deriver 100 (operation S120).

The analysis optimizer 300 performs the optimization for the result of the flow analysis previously performed by the flow analyzer 200 (operation S130).

The above-described operations S110, S120, and S130 will be described in more detail.

Figure 7:
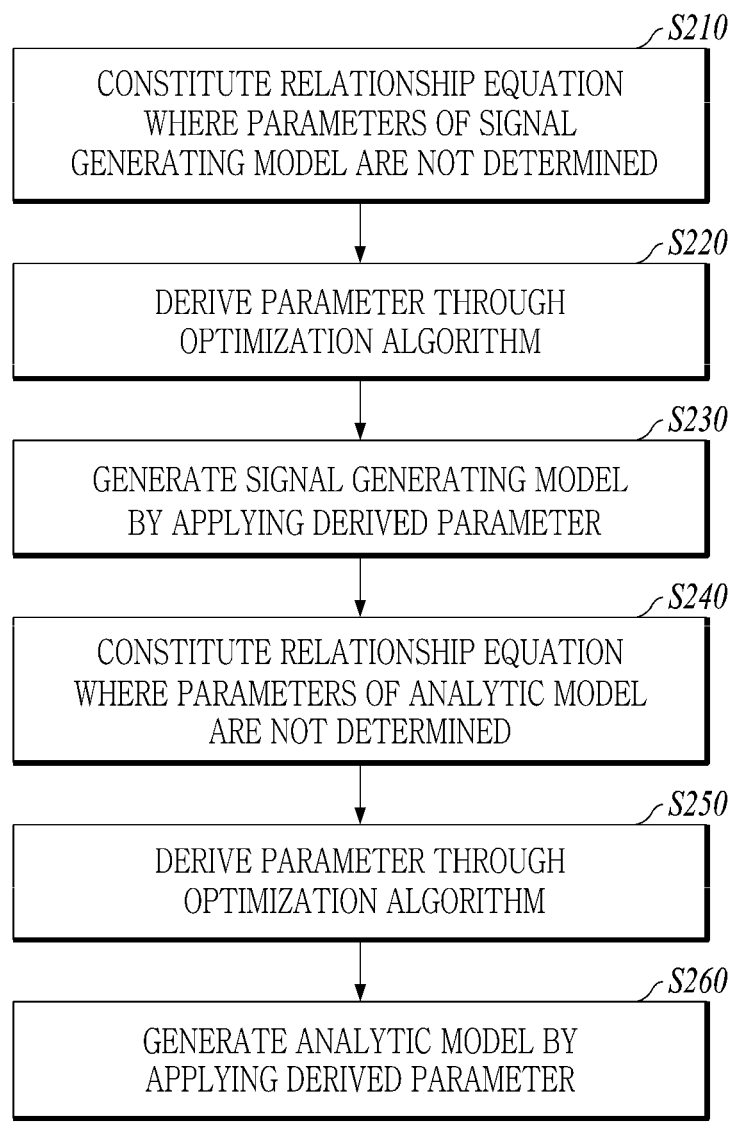
FIG. 7 is a flowchart for explaining a method for generating a flow analytic model according to an exemplary embodiment.

FIG. 7 is a flowchart for explaining a method for generating a flow analytic model (in operation S110) according to an exemplary embodiment.

Referring to FIG. 7, the signal generating model deriver 120 constitutes the relationship equation where the parameters, that is, the degree of influence H, the weight Q, and the cancellation constant D are not determined (operation S210). For example, the relationship equation where the parameters are not determined is as in the Equation 1 where the H, Q, and D are unknown.

The signal generating model deriver 120 puts the analytic data into the relationship equation, and derives the parameters H, Q, and D of the relationship equation by using the optimization algorithm (operation S220). Herein, the optimization algorithm can be, for example, a Least-Squares Method, a Backpropagation Algorithm, etc. For example, the analytic data can be V(k), Y(k), and V(k+T) used for the existing numerical analysis.

The signal generating model deriver 120 generates a signal generating model by applying the parameters H, Q, and D to the relationship equation (operation S230). For example, the signal generating model as in the Equation 1 is completed by applying the values of the parameters H, Q, and D to the relationship equation. This signal generating model predicts the input signal contributing to the output signal of the numerical analysis performed multiple times iterations.

The analytic model deriver 130 constitutes the relationship equation of the analytic model where the parameters, that is, the degree of influence A, the weight P, and the cancellation constant C are not determined (operation S240). For example, the relationship equation where the parameters are not determined is as in the Equation 2 where the parameters A, P, and C are unknown.

The analytic model deriver 130 puts the analytic data into the relationship equation, and derives the parameters A, P and C of the relationship equation through the optimization algorithm (operation S250). For example, the analytic data can be Y(k), V(k+T), and Y(k+T) used for the existing numerical analysis.

The analytic model deriver 130 generates the analytic model by applying the parameters A, P, and C to the relationship equation (operation S210). For example, the analytical model as in the Equation 2 is completed by applying the values of the parameters A, P, and C to the relationship equation. This analytical model predicts the output signal of the numerical analysis performed multiple times iterations.

As described above, the signal generating model is generated in operation S230, and the analytic model is generated in operation S260, thereby completing the flow analytic model including the signal generating model and the analytic model.

Figure 8:
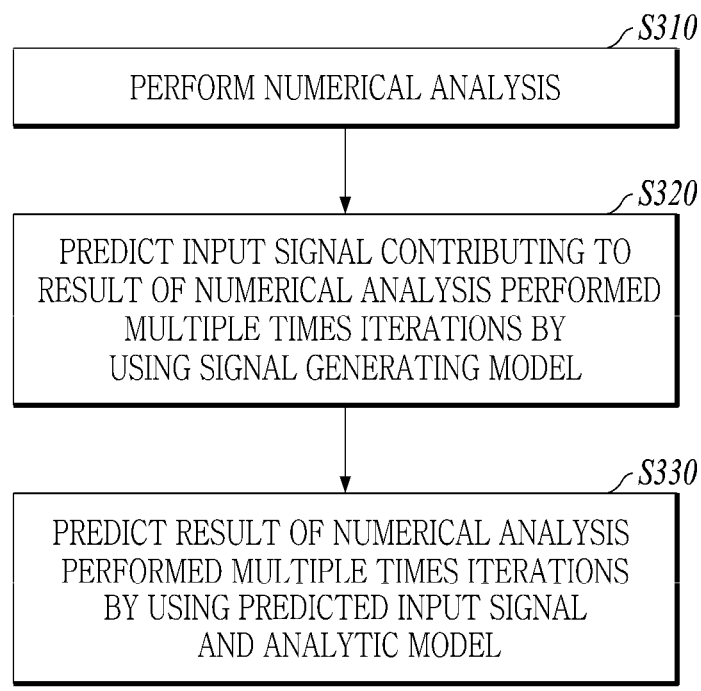
FIG. 8 is a flowchart for explaining a method for performing the flow analysis according to an exemplary embodiment.

FIG. 8 is a flowchart for explaining a method for performing the flow analysis (in operation S120) according to an exemplary embodiment.

Referring to FIGS. 2, 3, and 8, the numerical analyzer 210 performs the numerical analysis by Computational Fluid Dynamics (CFD) to derive an input signal and an output signal (operation S310). For example, according to the Equations 1 and 2, the input signal can be V(k), and the output signal can be Y(k).

The signal generator 220 predicts the input signal contributing to the output signal of the numerical analysis performed multiple times (k+T) iterations by reflecting the input signal and the output signal derived from the numerical analyzer 210 to the signal generating model (operation S320). For example, the signal generator 220 can derive the input signal $\hat{V}(k+T)$ contributing to the output signal of the numerical analysis performed multiple times (k+T) iterations by inputting the input signal V(k) and the output signal Y(k) to the signal generating model as in the Equation 1.

The analyzer 230 predicts the output signal of the numerical analysis performed multiple times (k+T) iterations by reflecting the input signal predicted by the signal generator 220 and the output signal derived from the numerical analyzer 210 to the analytic model derived from the analytic model deriver 130 (operation S330). For example, the analyzer 230 can derive the output signal $\hat{Y}(k+T)$ of the numerical analysis performed multiple times (k+T) iterations by inputting the predicted input signal $\hat{V}(k+T)$ and output signal Y(k) to the analytical model as in the Equation 2.

Meanwhile, referring to FIGS. 3 and 8, an exemplary embodiment with reference to FIG. 8 can be performed multiple times iterations. That is, the numerical analyzer 210 derives a plurality of analytic data (①, ②, ③, ④, ⑤) through iterations, and the signal generator 220 and the analyzer 230 of the flow analyzer 200 can derive a plurality of predicted data (ⓐ, ⓑ, ⓒ, ⓓ, ⓔ) corresponding to each of the plurality of analytic data (①, ②, ③, ④, ⑤). Therefore, the flow analyzer 200 can derive the plurality of output signals $\hat{Y}(k+T)$.

Figure 9:
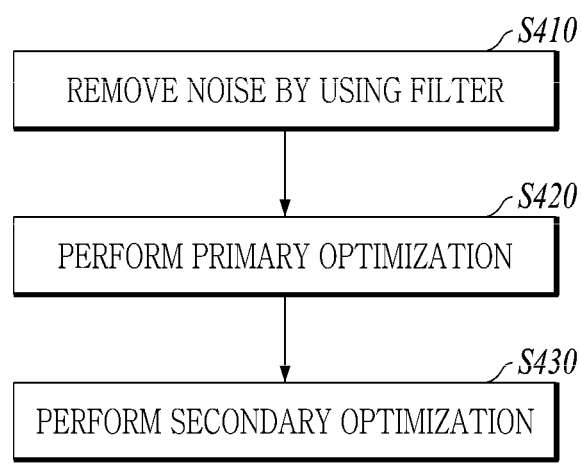
FIG. 9 is a flowchart for explaining a method for optimizing the result of the flow analysis according to an exemplary embodiment.

The analysis optimizer 300 performs the optimization for the plurality of output signals that are the result of the flow analysis of the flow analyzer 200. FIG. 9 is a flow chart for explaining a method for optimizing the result of the flow analysis (in operation S130) according to an exemplary embodiment.

Referring to FIG. 9, the filter 310 removes noise in each of the plurality of output signals derived from the flow analyzer 200 (operation S410). For example, the filter 310 can remove the noise by using filter technology. Herein, this filter can be, for example, an averaging filter, a moving average filter, a low-pass filter such as an exponentially weighted moving average filter, a high-pass filter, a band-pass filter, and a Kalman filter. For example, when using the exponentially weighted moving average filter, the filter 310 can remove the noise through the Equation 3.

The primary optimizer 320 outputs primary optimization data by optimizing the plurality of output signals from which the noise has been removed primarily according to the primary optimization operation (operation S420). For example, the primary optimizer 320 can perform the optimization operation primarily through the Equation 4. As described above, according to an exemplary embodiment, the primary optimizer 320 can output the average value of $s_1$ output signals as the primary optimization data through the primary optimization operation.

The secondary optimizer 330 receives a plurality of primary optimization data from the primary optimizer 320, and outputs secondary optimization data by optimizing the plurality of input primary optimization data secondarily (operation S430). For example, the secondary optimizer 330 can perform the secondary optimization operation through the Equation 5. As described above, according to an exemplary embodiment, the secondary optimizer 330 can output the average value of $s_2$ primary optimization data as the secondary optimization data through the secondary optimization operation.

Figure 10:
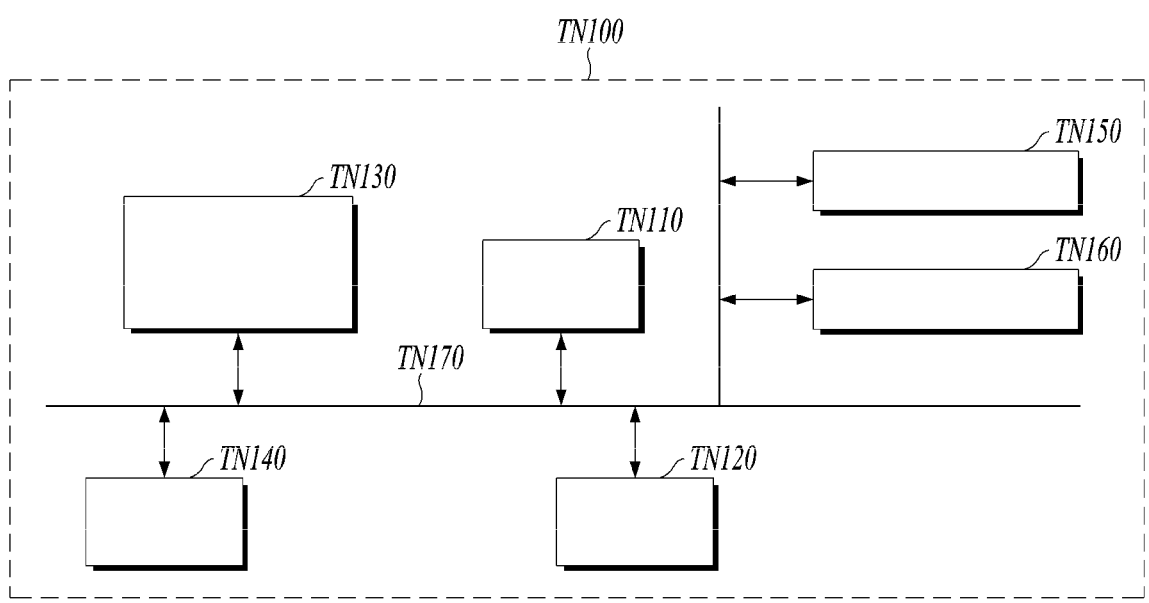
FIG. 10 is a diagram illustrating a computing apparatus according to an exemplary embodiment.

FIG. 10 is a diagram illustrating a computing apparatus according to an exemplary embodiment. A computing apparatus TN100 can be the apparatus described in the present specification (e.g., the flow analysis apparatus, etc.).

Referring to FIG. 10, the computing apparatus TN100 can include at least one processor TN110, a transceiver TN120, and a memory TN130. In addition, the computing apparatus TN100 can further include a storage device TN140, an input interface TN150, and an output interface TN160, etc. The components included in the computing apparatus TN100 can be connected by a bus TN170 and communicate with each other.

The processor TN110 can execute a program command stored in at least one of the memory TN130 and the storage device TN140. The processor TN110 can include a central processing unit (CPU), a graphics processing unit (GPU), or a dedicated processor on which the methods according to an exemplary embodiment are performed. The processor TN110 can be configured to implement the procedures, functions, methods, etc. described in connection with an exemplary embodiment. The processor TN110 can control each component of the computing apparatus TN100.

Each of the memory TN130 and the storage device TN140 can store various information related to an operation of the processor TN110. Each of the memory TN130 and the storage device TN140 can be composed of at least one of a volatile storage medium and a nonvolatile storage medium. For example, the memory TN130 can be composed of at least one of a read only memory (ROM) and a random access memory (RAM).

The transceiver TN120 can transmit and/or receive a wired signal or a wireless signal. The transceiver TN120 can be connected to a network to perform communication.

Meanwhile, various methods according to an exemplary embodiment described above can be implemented in the form of a readable program through various computer means and recorded in a computer-readable recording medium. Herein, the recording medium can include program commands, data files, data structures, etc. alone or in combination thereof. The program commands to be recorded on the recording medium can be those specially designed and constructed for the present disclosure or can also be those known and available to those skilled in the art of computer software. For example, the recording medium can be magnetic media such as hard disks, floppy disks, and magnetic tapes, optical media such as CD-ROMs and DVDs, magneto-optical media such as FL optical disks, and hardware devices specially configured to store and execute the program commands such as ROMs, RAMs, and flash memory. Examples of the program commands can include not only machine language wires such as those produced by a compiler but also high-level language wires that can be executed by a computer by using an interpreter, etc. This hardware device can be configured to operate as one or more software modules in order to perform the operation of the present disclosure, and vice versa.

While one or more exemplary embodiments have been described with reference to the accompanying drawings, it is to be understood by those skilled in the art that various modifications and changes in form and details can be made therein without departing from the spirit and scope as defined by the appended claims. Therefore, the description of the exemplary embodiments should be construed in a descriptive sense only and not to limit the scope of the claims, and many alternatives, modifications, and variations will be apparent to those skilled in the art

What is claimed is:

1. A flow analysis apparatus comprising:
a processor and a memory storing computer program commands, the computer program commands when executed by the processor implement the steps of:
(a) acquiring training data for an artificial neural network comprising;
storing, in the memory, a plurality of input signals with respect to a plurality of cells that divide a space around a structural component wherein the plurality of input signals includes a laminar flow viscosity or a turbulent conduction and;
producing, by the processor, a plurality of output signals at an initial stage of fluid flow corresponding to each of the plurality of input signals by performing Computational Fluid Dynamics (CFD) numerical analysis a predetermined number of times, wherein the plurality of output signals includes a density, a momentum, or an internal energy;
(b) training, by the processor, parameters of a first artificial neural network model by inputting the plurality of input signals and the plurality of output signals to the first artificial neural network model, wherein the first artificial neural network model predicts an input signal at a steady state of the fluid flow;
(c) generating, by the processor, a plurality of predicted input signals using the first artificial neural network model;
(d) training, by the processor, parameters of a second artificial neural network model by inputting the plurality of output signals and the plurality of predicted input signals to the second artificial neural network model, wherein the second artificial neural network model predicts an output signal at the steady state of the fluid flow;
(e) generating, by the processor, a plurality of predicted output signals using the second artificial neural network model; and
(f) performing optimization for the plurality of predicted output signals.

2. The flow analysis apparatus of claim 1, wherein the performing of the optimization includes a primary optimization generating primary optimization data from the plurality of predicted output signals through an Equation $$\hat{Y}_{nf}^1(k+T^1) = \frac{1}{s_1+1} \sum_{k_s=0}^{s_1} [\hat{Y}^1(k+T^1-k_s)], l = 1, \cdots, g$$

wherein the $k+T^l$ refers to the number of times of the CFD numerical analysis,
wherein the l refers to a cell to be analyzed and has 1 to g cells (g is a natural number),
wherein the $s_1+1$ refers to the number of the plurality of predicted output signals used for the primary optimization,
wherein the $\hat{Y}^l$ refers to the plurality of predicted output signals, and
wherein the $\hat{Y}_{nf}^l$ refers to the primary optimization data.

3. The flow analysis apparatus of claim 2, wherein the performing of the optimization further includes a secondary optimization generating secondary optimization data from the primary optimization data through an Equation, $$\hat{Y}_f^1(k+T^1) = \frac{1}{s_2+1} \sum_{k_l=0}^{s_2} [\hat{Y}_{nf}^1(k+T^1-k_s)], l = 1, \cdots, g$$

wherein the $k+T^l$ refers to the number of times of the CFD numerical analysis,
wherein the l refers to a cell to be analyzed and has 1 tog cells (g is a natural number),
wherein the $s_2+1$ refers to the number of the primary optimization data used for the secondary optimization,
wherein the $\hat{Y}_{nf}^l$ refers to the primary optimization data, and
wherein the $\hat{Y}_f^l$ refers to the secondary optimization data.

4. The flow analysis apparatus of claim 1,
wherein the first artificial neural network model generates the plurality of predicted input signals through a hypothesis $$\hat{V}(k+T) = HQ \begin{bmatrix} V(k) \\ Y(k) \end{bmatrix} + D$$

wherein the k+T refer to the number of times of numerical analysis using the CFD
numerical analysis,
wherein the H refers to a degree of influence,
wherein the Q refers to a weight,
wherein the D refers to a cancellation constant,
wherein the V(k) refers to an input signal of the $k^{th}$ CFD numerical analysis,
wherein the Y(k) refers to an output signal of the $k^{th}$ CFD numerical analysis, and
wherein the V(k+T) refers to an input signal of the $(k+T)^{th}$ CFD numerical analysis, the predicted input signal V(k+T) contributing to the output signal according to the $(k+T)^{th}$ CFD numerical analysis being derived from the analytic data including the input signal V(k) and the output signal Y(k) used for the $k^{th}$ CFD numerical analysis.

5. The flow analysis apparatus of claim 1, wherein the second artificial neural network generates the plurality of predicted output signals through a hypothesis $$\hat{Y}(k+T) = AP \begin{bmatrix} Y(k) \\ \hat{V}(k+T) \end{bmatrix} + C$$

wherein the k+T refer to the number of times of numerical analysis using CFD, wherein the A refers to a degree of influence,
wherein the P refers to a weight,
wherein the C refers to a cancellation constant,
wherein the Y(k) refers to an output signal of the $k^{th}$ CFD numerical analysis,
wherein the V(k+T) refers to an input signal of the $(k+T)^{th}$ CFD numerical analysis,
and wherein the Y(k+T) refers to a predicted output signal of the $(k+T)^{th}$ CFD numerical analysis, the predicted output signal Y(k+T) according to the $(k+T)^{th}$ CFD numerical analysis being derived from the output signal Y(k) used for the $k^{th}$ CFD numerical analysis and the input signal V(k+T) of the (k+T)$^{th}$ CFD numerical analysis derived by the first artificial neural network model and the second artificial neural network model.

6. A flow analysis method for predicting dynamics of fluids around a structural component using artificial neural network models, thereby reducing time spent in design and analysis of the structural component, comprising:
(a) acquiring training data for an artificial neural network comprising;
storing, in the memory, a plurality of input signals with respect to a plurality of cells that divide a space around the structural component wherein the plurality of input signals includes a laminar flow viscosity or a turbulent conduction and;
producing, by the processor, a plurality of output signals at an initial stage of fluid flow corresponding to each of the plurality of input signal by performing Computational Fluid Dynamics (CFD) numerical analysis a predetermined number of times, wherein the plurality of output signals includes a density, a momentum, or an internal energy;
(b) training, by the processor, parameters of a first artificial neural network model by inputting the plurality of input signals and the plurality of output signals to the first artificial neural network model, wherein the first artificial neural network model predicts an input signal at a steady state of the fluid flow;
(c) generating, by the processor, a plurality of predicted input signals using the first artificial neural network model;
(d) training, by the processor, parameters of a second artificial neural network model by inputting the plurality of output signals and the plurality of predicted input signals to the second artificial neural network model, wherein the second artificial neural network model predicts an output signal at the steady state of the fluid flow;
(e) generating, by the processor, a plurality of predicted output signals using the second artificial neural network model; and
(f) performing optimization for the plurality of predicted output signals, wherein the performing the optimization comprises:
removing, by a filter, noise in each of the plurality of predicted output signals;
optimizing, by a primary optimizer, the predicted output signal from which the noise has been removed primarily; and
optimizing, by a secondary optimizer, the primarily optimized output signal secondarily.

7. The flow analysis method of claim 6, wherein the optimizing the output primarily comprises:
deriving, by the primary optimizer, primary optimization data by optimizing the plurality of predicted output signals primarily through an Equation $$\hat{Y}_{nf}^1(k+T^1) = \frac{1}{s_1+1} \sum_{k_s=0}^{s_1} \left[ \hat{Y}^1(k+T^1-k_s) \right], l = 1, \cdots, g,$$

wherein the k+T$^l$ refers to the number of times of the CFD numerical analysis,
wherein the l refers to a cell to be analyzed and has 1 to g cells (g is a natural number), wherein the $s_1$+1 refers to the number of the plurality of predicted output signals used for the primary optimization,
wherein the $\hat{Y}^l$ refers to the plurality of predicted output signals, and
wherein the $\hat{Y}_{nf}^l$ refers to the primary optimization data.

8. The flow analysis method of claim 6,
wherein the performing of the optimization further includes a secondary optimization generating secondary optimization data from the primary optimization data through an Equation, $$\hat{Y}_f^1(k+T^1) = \frac{1}{s_2+1} \sum_{k_t=0}^{s_2} \left[ \hat{Y}_{nf}^1(k+T^1-k_t) \right], l = 1, \cdots, g$$

wherein the k+T$^l$ refers to the number of times of the CFD numerical analysis,
wherein the l refers to a cell to be analyzed and has 1 tog cells (g is a natural number),
wherein the $s_2$+1 refers to the number of the primary optimization data used for the secondary optimization,
wherein the $\hat{Y}_{nf}^l$ refers to the primary optimization data, and
wherein the $\hat{Y}_f^l$ refers to the secondary optimization data.

9. The flow analysis method of claim 6,
wherein the first artificial neural network model generates the plurality of predicted input signals through a hypothesis $$\hat{V}(k+T) = HQ \begin{bmatrix} V(k) \\ Y(k) \end{bmatrix} + D$$

wherein the k+T refer to the number of times of numerical analysis using the CFD numerical analysis,
wherein the H refers to a degree of influence,
wherein the Q refers to a weight,
wherein the D refers to a cancellation constant,
wherein the V(k) refers to an input signal of the k$^{th}$ CFD numerical analysis,
wherein the Y(k) refers to an output signal of the k$^{th}$ CFD numerical analysis, and wherein the V(k+T) refers to an input signal of the (k+T)$^{th}$ CFD numerical analysis, the predicted input signal V(k+T) contributing to the output signal according to the (k+T)$^{th}$ CFD numerical analysis being derived from the analytic data including the input signal V(k) and the output signal Y(k) used for the k$^{th}$ CFD numerical analysis.

10. The flow analysis method of claim 6, wherein the second artificial neural network generates the plurality of predicted output signals through a hypothesis $$\hat{Y}(k+T) = AP \begin{bmatrix} Y(k) \\ \hat{V}(k+T) \end{bmatrix} + C$$

wherein the k+T refer to the number of times of numerical analysis using CFD, wherein the A refers to a degree of influence,
wherein the P refers to a weight,
wherein the C refers to a cancellation constant,
wherein the Y(k) refers to an output signal of the k$^{th}$ CFD numerical analysis, wherein the V(k+T) refers to an input signal of the $(k+T)^{th}$ CFD numerical analysis, and wherein the Y(k+T) refers to a predicted output signal of the $(k+T)^{th}$ CFD numerical analysis, the predicted output signal Y(k+T) according to the $(k+T)^{th}$ CFD numerical analysis being derived from the output signal Y(k) used for the $k^{th}$ CFD numerical analysis and the input signal V(k+T) of the $(k+T)^{th}$ CFD numerical analysis derived by the first artificial neural network model and the second artificial neural network model.

* * * * *